(12) United States Patent
Grim, III et al.

(10) Patent No.: US 9,917,819 B2
(45) Date of Patent: Mar. 13, 2018

(54) SYSTEM AND METHOD FOR PROVIDING A PROXIED CONTACT MANAGEMENT SYSTEM

(75) Inventors: Clifton E. Grim, III, Seabrook, TX (US); Christopher I. Schmidt, Friendswood, TX (US); John D. Wilson, Houston, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1252 days.

(21) Appl. No.: 11/035,294

(22) Filed: Jan. 13, 2005

(65) Prior Publication Data
US 2006/0156022 A1    Jul. 13, 2006

(51) Int. Cl.
G06F 21/00    (2013.01)
H04L 29/06    (2006.01)
G06F 21/62    (2013.01)

(52) U.S. Cl.
CPC ...... *H04L 63/0442* (2013.01); *G06F 21/6245* (2013.01); *G06F 21/6263* (2013.01); *H04L 63/08* (2013.01); *H04L 63/102* (2013.01)

(58) Field of Classification Search
CPC ..................................................... G06Q 50/00
(Continued)

(56) References Cited

U.S. PATENT DOCUMENTS 5,594,798 A * 1/1997 Cox ......................... H04K 1/00
                                                        379/442
6,226,630 B1 5/2001 Billmers
(Continued)

FOREIGN PATENT DOCUMENTS

EP    1 143 349    10/2001

OTHER PUBLICATIONS

Experiences with Selecting Search Engines Using Metasearch, by Dreilinger et al., ACM Transactions on Information System, vol. 15, No. 3, Jul. 1997, pp. 195-222.
(Continued)

*Primary Examiner* — Chinedu C Agwumezie
(74) *Attorney, Agent, or Firm* — Christopher K. McLane; Andrew M. Calderon; Roberts Mlotkowski Safran Cole & Calderon P.C.

(57) ABSTRACT

A system and method for providing a Proxied Contact Management System (PCMS) so that individual owners of personal contact data may control and manage the access and dissemination of their personal data and also control who may contact them. The owner of personal contact data may securely register the data with a secured information vault of the PCMS and specify which other parties may contact them. In this way, duplication of the personal data is avoided, but at the same time is always current. In use, a second party's device, such as a telephone or a PDA may request that the PCMS, under public key infrastructure (PKI) control, establish a connection with the first party. Once verified, the PCMS may establish a proxy connection between the first and second parties according to the permitted mode of communication defined by criteria established by the first party and managed by the PCMS. In this way, personal contact information, such as a telephone number, is kept secure and private and not provided to the second party.

16 Claims, 8 Drawing Sheets

(58) Field of Classification Search
USPC .......................................................... 705/50
See application file for complete search history.

(56) References Cited

U.S. PATENT DOCUMENTS

| | | | |
|---|---|---|---|
| 6,424,718 B1* | 7/2002 | Holloway | .................... 380/277 |
| 6,490,575 B1 | 12/2002 | Berstis | |
| 6,633,311 B1 | 10/2003 | Douvikas et al. | |
| 6,681,223 B1 | 1/2004 | Sundaresan | |
| 6,728,701 B1 | 4/2004 | Stoica | |
| 6,757,362 B1 | 6/2004 | Cooper et al. | |
| 7,111,172 B1* | 9/2006 | Duane et al. | ................. 713/182 |
| 7,143,293 B2* | 11/2006 | Maggenti | ...................... 713/182 |
| 2003/0023562 A1* | 1/2003 | Bailey | ................ G06F 21/6245 705/51 |
| 2003/0037112 A1 | 2/2003 | Fitzpatrick et al. | |
| 2003/0063735 A1* | 4/2003 | Brockenbrough | .. H04L 63/0407 379/245 |
| 2003/0131005 A1 | 7/2003 | Berry | |
| 2004/0203713 A1* | 10/2004 | Strunk | .................. H04M 1/575 455/422.1 |
| 2004/0236792 A1* | 11/2004 | Celik | ........................ 707/104.1 |
| 2005/0265554 A1* | 12/2005 | Walker | ..................... H04K 1/00 380/283 |
| 2006/0085341 A1 | 4/2006 | Grim, III et al. | |
| 2006/0085344 A1 | 4/2006 | Grim, III et al. | |
| 2006/0140200 A1* | 6/2006 | Black et al. | .................. 370/401 |
| 2006/0141981 A1* | 6/2006 | Lin | .............................. 455/403 |
| 2009/0006124 A1* | 1/2009 | Sinclair | ............... G06F 21/6245 705/325 |
| 2009/0259858 A1* | 10/2009 | Walker | ..................... H04K 1/00 713/194 |
| 2009/0282260 A1* | 11/2009 | Tattan | ..................... G06F 21/32 713/186 |

OTHER PUBLICATIONS

Creating a Massive Master Index for HTML and Print, by Scott et al., pp. 186-193.
Information Retrieval on the Web, by Kobayashi et al., pp. 1-21.

* cited by examiner

SYSTEM AND METHOD FOR PROVIDING A PROXIED CONTACT MANAGEMENT SYSTEM

CROSS REFERENCE TO RELATED APPLICATIONS

This application is related to co-pending U.S. application Ser. No. 10/965,592 filed Oct. 14, 2004, which is now incorporated by reference in its entirety herein.

DESCRIPTION

Field of the Invention

The invention generally relates to a system and method for a proxied contact management system and, more particularly, to a system and method for sharing personal information with others via a proxied contact management system employing an information vault.

Currently, contact management is typically accomplished by duplicating personal contact information of people that an individual maintains in many places including telephones, personal digital assistants (PDAs), web based contact lists and personal computers (PCs), or the like. This may be both a privacy issue (e.g., exposing personal information of friends/contacts if the data is lost) and a data entering/duplication/maintenance issue, e.g., a user must typically enter the data in all the different devices and keep it updated. As such, there exists no general, secure mechanism for someone to share their personal contact-list type information (i.e., personal data) with others that would keep them from losing it, sharing it, duplicating it, or allowing it to get out of date.

In addition, there is no general, secure mechanism to enforce the expectation that only those chosen to receive one's contact information are actually the people that are permitted or desired to contact you. In other words, if a telephone number is provided to someone, even in a secure way, once they have the information they could give it to someone else who could violate the original intentions and trusts and use the information to call the original owner of the data.

Further, there is no apparent way to enable a financial transaction based on the contact information, thus, it is not possible to incur financial remuneration or a transaction fee for having received and/or used the contact information. This possible loss or sharing of your personal information and/or the loss of the contact remuneration may mean loss of privacy and the possibility of being subject to spam (undesired or unrequested communications), telemarketing calls, junk faxes, etc. from strangers who may contact the original owner of the information at will with no monetary remuneration.

Contact lists such as Outlook contacts databases, and Yahoo contacts databases, all typically store personal contact information of contacts in their databases, either locally and/or centrally. Simply being stored very often results in the data being compromised by security failures in all the various storage or communication infrastructures that may be involved. In addition, there is no way for an individual to provide their contact information to someone in a way that would prevent that person from giving it away to others.

Contact mechanisms such as email, telephone, instant messaging (IM), or the like all require a public knowledge of the addressing mechanism involved in the system (e.g., telephone numbers, email address, userIDs, etc). As long as the addressing mechanism involves public knowledge, then there will typically be the potential for security and privacy abuse.

A mechanism and/or process is needed to ensure that only those chosen to be able to contact an owner of contact information can do so and that the mechanism or process works in such a way that it cannot be usurped by someone else. Further, the operation should function in a way that allows for financial remunerations, particularly for commercial use of the contact information.

SUMMARY OF THE INVENTION

In an aspect of the invention, a method of managing communications is provided. The method comprises the steps of depositing personal contact data of a first party into a secured proxied contact management system (PCMS) and identifying at least one entity to the secure PCMS to enable proxied communications by the at least one entity to the first party. Further included are the steps of specifying indicia to control access to the personal contact data and establishing or denying the proxied communications to the first party from the at least one entity based on the indicia.

In another aspect of the invention, a method of providing communications is provided. The method comprises the steps of requesting a connection to a first party by a second party at a PCMS by submitting a public key to identify the first party, validating whether the second party is permitted to contact the first party by using the public key to locate indicia associated with the first party and if permitted, establishing communications between the first party and the second party while preventing the second party from receiving any information regarding contact information of the first party.

In another aspect of the invention, a proxied contact management system (PCMS) is provided. The PCMS comprises a data storage medium which securely contains personal contact information and a contact information storage system which securely stores the personal contact information of a first user of a plurality of users. Further, the PCMS comprises a contact information accessing system which accesses the contact information when a request is made by a second user of the plurality of users, wherein the accessing is controlled based upon an identification of the first user and a connection control system which establishes, maintains and releases a connection between the first user of a plurality of users and the second user of the plurality of users based upon indicia associated with the first user.

In another aspect of the invention, a computer program product comprising a computer usable medium having readable program code embodied in the medium is provided. The computer program product includes at least one component to deposit personal contact data of a first party into a secured proxied contact management system (PCMS) and identify at least one entity to the secure PCMS to enable proxied communications by the at least one entity to the first party. Further provided is the at least one component to specify indicia to control access to the personal contact data and to establish or deny the proxied communications to the first party from the at least one entity based on the indicia.

DETAILED DESCRIPTION OF EMBODIMENTS OF THE INVENTION

This invention is generally directed to a system and method for providing a proxied contact management system (PCMS) based on a contact management system (CMS) and information vault so that individual owners of contact information may securely control and manage the access and use of the contact information by other users via pre-defined arrangements. "Proxied" includes services or functions supplied by an entity or person on behalf of another entity or person. Also, the system and method may also provide for the owner of the personal data to receive compensation for the use of the contact information.

Figure 1:
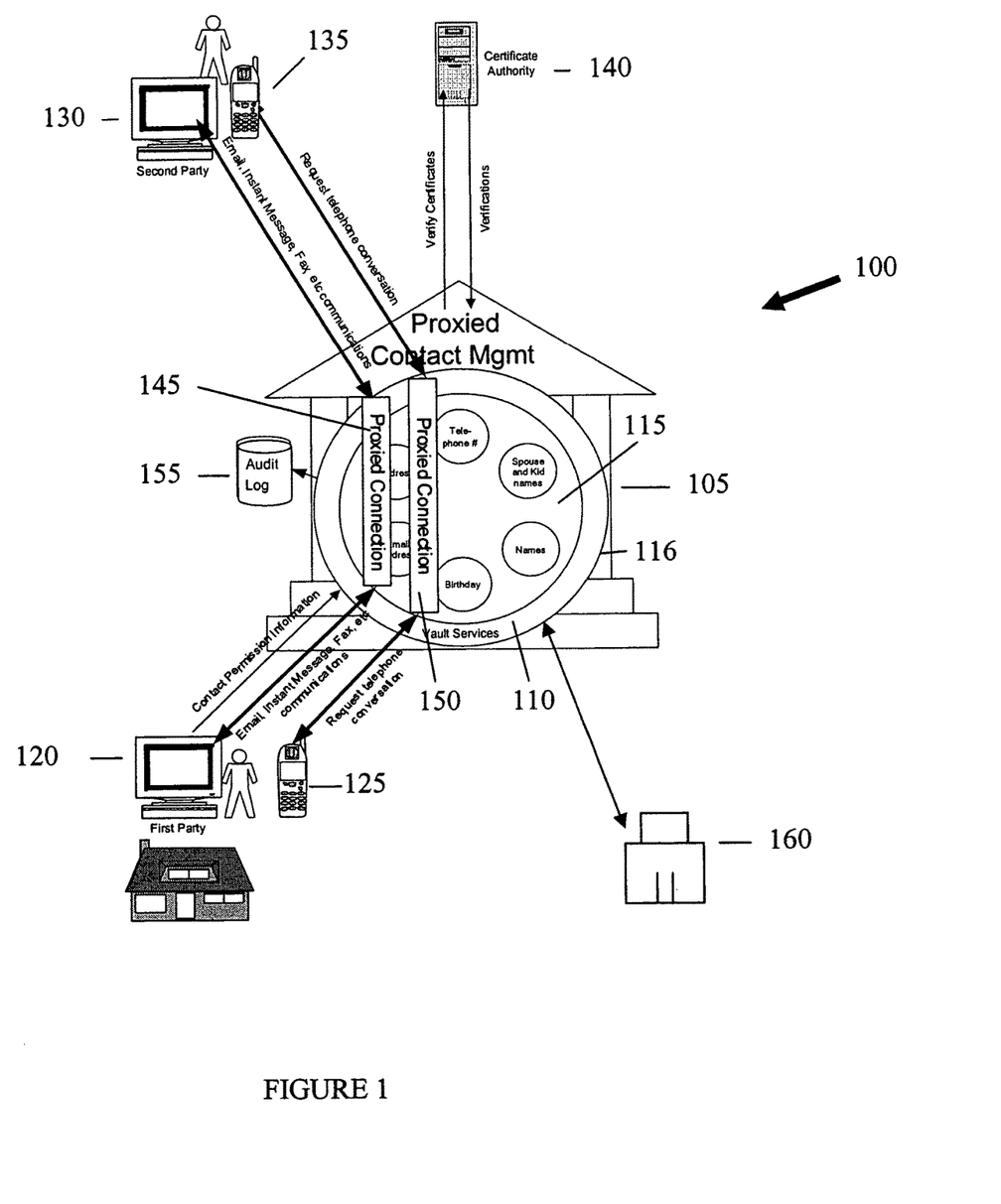
FIG. 1 is a functional block diagram of an embodiment of the system of the invention.

FIG. 1 is a functional block diagram of an embodiment of the system of the invention, generally denoted by reference numeral 100. The proxied contact management system (PCMS) 100 includes a secured information vault 105 which may include one or more databases controlled by one or more servers perhaps with extensive security control layers. An example of a secured vault may be found in copending application Ser. No. 10/965,592.

Also included are vault services 110 for accessing and updating the vault 105, one or more data objects 115 such as files containing contact management control data, telephone numbers, birthday information, family names, email addresses, or other personal data. The system may also include devices used by users of the vault who may employ computers, personal digital assistants (PDAs), telephones, or the like. Examples may include a first party personal computer 120, a first party cell phone 125, a second party personal computer 130 and a second party cell phone 135.

The information vault 105 (or simply vault) of the PCMS 100 may also employ a third party authentication authority 140 for verifying and authentication parties involved with any vault transaction. An example of third party authentication may be found in copending patent application Ser. No. 10/965,592, incorporated by reference, herein. The PCMS 100 may also include a database for logging ongoing vault transactions for recording any activity such as accesses or proxied contact management connections 145, 150, described more fully below.

The vault 105 also provides for personal contact information to be uploaded to it by the owner (e.g., via first party personal computer 120) and may be protected by a public key infrastructure (PKI) based access control system that controls access to the stored data by people who have been granted that privilege. The vault services 110 are built on the vault's secure storage to allow users to create accounts, deposit the contact information, and read, update or remove the information. Information may be stored in the vault encrypted by the vault and optionally, users may encrypt the information with their own private key. In addition, vault services 110 are provided to also allow a user to specify conditions, in a secure way via technologies of the existing PKI, so that a second party may only perform certain types of communications when contacting the owner. All accesses typically use the first and second party's public keys as identification.

Additionally, the vault 105 may be provisioned with a financial backend 160, perhaps by network connection. The financial backend 160 may execute financial transactions such as debit or credits for the contact information owner or information user's financial bank accounts.

The PCMS 100 employs a secure Contact Management System (CMS) 116. A secure CMS 116 allows contact information owners and users to exchange their contact information in a secure way. An example of a secure CMS may be found in copending U.S. patent application Ser. No. 10/964,876, incorporated by reference herein.

A PKI based vault (e.g., vault 105) stores contact information and serves to proxy actual contacts. Thus, the PCMS is authorized to act on a user's behalf and field all contact attempts to reach the user. Upon fielding a contact attempt, the PCMS verifies that an owner (e.g., the first party) of the contact information has authorized that person (e.g., a second party) to contact the first party via the PCMS. The PCMS contacts the first party via the same mechanism used by the originating second party (e.g., a phone call, an email, a FAX, or the like) and then enables the connection to be sustained until complete. The enablement of the connection, i.e., the proxied connection 145 or 150, may be a different technological implementation for each different contact type (e.g., FAX, email, phone, page, instant messaging, etc.) and may be implemented with electronic computing systems, networks, and/or Internet Protocols that exist today. In addition, the PCMS may maintain contact remuneration information about the authorized contact so that a fee may be charged to a commercial contactor (or other entity) for the right of the contact.

Users of the PCMS would typically have digital certificates and public keys which may be the basis for implementing shared contact information. For example, if an owner of contact information chooses to share the contact information with a friend so that the friend could call the owner (or email, FAX, IM, or other communication mode), the owner may add their public key to the vault 105 and grant access at the vault for the friend to contact the owner by telephone. The owner's telephone number would be stored only in the owner's vault account, and never in any other device, such as the friend's phone. Instead, only the owner's public key would be stored in the friend's device. In this way, the owner's contact information is securely maintained as private and avoids disclosing direct contact information such as phone numbers, email addresses, or the like.

Thereafter, when using the device, the friend's device(s) authenticates the friend as a valid user of the device (e.g., via digital certificate and/or pass phrase). The devices know how to automatically locate and access the vault when a contact attempt is initiated, e.g., a predetermined network address previously stored in the devices. Upon receiving a request and the public key of the called party from the friend's device, the vault 105 then acts as a proxy, e.g., using voice over internet protocol (VoIP) technologies and a "telephone number" (alternatively, an "addressing identifier") scheme that uses the dialed person's public key. In one application, the vault verifies the that the friend has the "calling" level of contact permission, i.e., the friend may indeed make this type of contact (such as a telephone call), and then, instead of returning a phone number to the friend, the vault initiates a call to the called party and acts as the go between, or proxy, (using VoIP switching technologies). The vault completes the proxied connection (e.g., 145 or 150) depending on type of technology involved for the contact, and allows the "call" to proceed. The vault may also restrict access per predefined time of day, day of week, or other called-party enabled features that may temporarily restrict/block calling.

Other personal contact mechanisms may be proxied in similar fashions. For example, emails may be sent to the information vault first, addressed to the addressee via the addressee's public key such as, for example, "pk1as3df3fas4ggnyo79988dsmansna8uudy@vaultaddress" and digitally signed by the sender's private key so that the PCMS may be assured as to the sender's authenticity. The PCMS may also verify that the sender has email permission to contact the addressee. If the sender has been given email access to the addressee, the PCMS may proceed to place the email into the addressee's vault email box.

In this manner, the system and method of the invention thus provides advantages which include, but not limited only to these examples:

Elimination of telemarketing calls.
Elimination of spam email.
Elimination of spam instant messaging.
Elimination of junk faxes.
Elimination of junk spam text messages.
Elimination of spam video messages.
Ensuring that a granted contact to one entity does not facilitate giving private information to anyone else or permits transferring the right to someone else.
Ensuring that an owner's telephone number is not compromised if the granted user loses their device. That is, anyone finding the user's device (e.g., a phone) is not able to use it without access to the digital certificate authentication.
Ensuring that the user always obtains the owner's correct (e.g., current due to any changes) telephone number, email address, or the like.
Ensuring that the owner of the contact information may be paid for a commercial contact using the PCMS per pre-established agreements.
Controlling when and where communications may be made.

With this approach, the user/owner provides the second party permission upon a request, to read an agreed upon set of personal information such as phone numbers, names, addresses, or the like. As the information is thereafter always available to the second party (at least until cancellation or recasting of the permissions), there is no longer any need for the second party to store the user's personal information within its own databases or devices. As a trusted third party for information, then, the PCMS 100 significantly contributes to the elimination of the escalating dangers of identity theft and significantly reduces the need for duplicate copies of information.

Thus, the system and method of the invention provides for many contact mechanisms to be proxied, thus ensuing privacy and more rigorous control of personal contact information. These contact mechanisms that may be proxied include, but are not limited to, email, telephone (including voice-over-IP and cell phones), instant message, text message, fax, and video phone. Essentially, any communication may be proxied wherein the contact mechanism is deliverable over the Internet (or any similar network) via IP protocols (or similar protocols) and subject to digital signing and encryption mechanisms of the PCMS.

The following provides additional aspects associated with certain proxied communications:

Email:
To proxy the email type contact, users may be given mail boxes on the PCMS. Email senders may send email to the PCMS domain addressed to the receiver's (addressee's) public key. When verified by the PCMS, the email may be placed in the receiver's mailbox. The body of the email would typically be digitally signed with the sender's private key and verified (for having been signed by the sender and not having been changed enroute) by the PCMS using the sender's public key. The email may also be encrypted with the destination's public key to keep anyone else from reading the email enroute.

Telephone:
To proxy the telephone type contact, Voice over IP (VoIP) switching technologies may be utilized by the PCMS to take IP based telecommunications from IP based telephones or devices and implement the proxied connection. Calls may be prefaced with digitally signed authentication protocols and encrypted with the public keys. The VoIP messages would typically all be digitally signed with the sender's private key and verified (for having been signed by the sender and not having been changed enroute) by the PCMS using the sender's public key. The VoIP messages may also be encrypted with the destination's public key to keep anyone else from listening to the conversion enroute.

Instant Messaging (IM):
To proxy the IM type contact, users may be given IM accounts on the PCMS. IM clients may send messages to the PCMS domain addressed to the receiver's public key. When verified by the PCMS, the IM may be passed on to the receiver's IM client. The body of the IM may also be digitally signed with the sender's private key and verified (for having been signed by the sender and not having been changed enroute) by the PCMS using the sender's the public key. The IM may also be encrypted with the destination's public key to keep anyone else from reading the IM enroute.

Text Messaging (TM):
To proxy the TM type contact, users may be given TM accounts on the PCMS. TM clients may send messages to the PCMS domain addressed to the receiver's public key. When verified by the PCMS, the TM may be passed on to the receiver. The body of the TM may be digitally signed with the sender's private key and verified (for having been signed by the sender and not having been changed enroute) by the PCMS using the sender's public key. The TM may also be encrypted with the destination's public key to keep anyone else from reading the TM enroute.

Fax:
To proxy the facsimile (fax) type contact, users may be given fax accounts on the PCMS. Fax machines would have to be changed to accept users' digital certificates and may then send faxes to the PCMS domain addressed to the receiver's public key. When verified by the PCMS, the fax may be passed on to the receiver (i.e., addressee). The body of the fax may be digitally signed with the sender's private key and verified (for having been signed by the sender and not having been changed enroute) by the PCMS using the sender's the public key. The fax may also be encrypted with the destination's public key to keep anyone else from reading the fax enroute.

Videophone:

To proxy the Videophone type contact, Video over IP switching technologies may be utilized by the PCMS to take IP based telecommunications from IP based video telephones and implement the proxied connection. Calls may be prefaced with digitally signed authentication protocols and encrypted with the destination's public key. The videophone messages may all be digitally signed with the sender's private key and verified (for having been signed by the sender and not having been changed enroute) by the PCMS using the sender's the public key. The video phone messages may also be encrypted with the destination's public key to keep anyone else from reading the IM enroute.

Examples of Using the Invention

Figure 2:
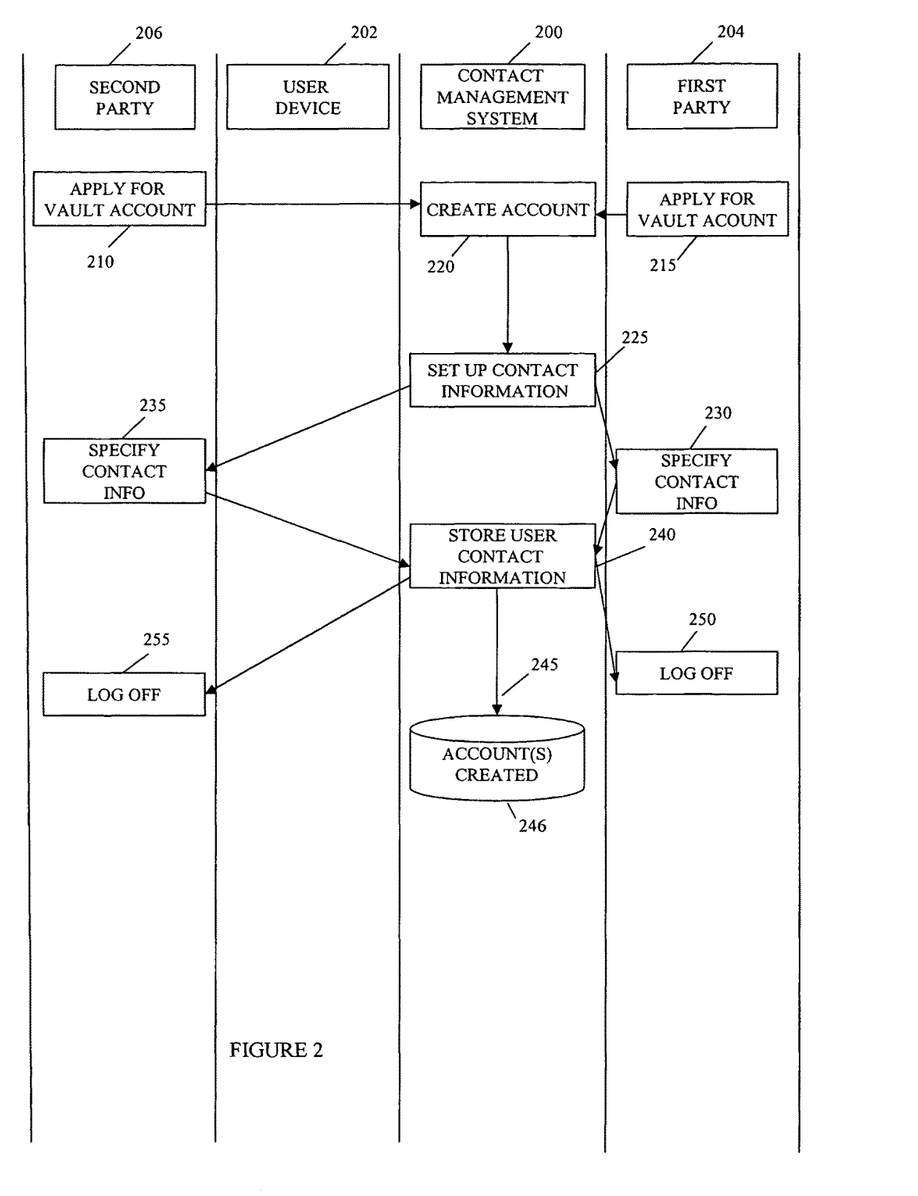
FIG. 2 is a swim lane diagram showing steps of an embodiment of creating a user account, according to the invention.

FIG. 2 is a swim lane diagram showing steps of an embodiment of a creating a user account. "Swim lane" diagrams may be used to show the relationship between the various "actors" in the processes and to define the steps involved in the processes. FIG. 2 (and all the other swim lane figures) may equally represent a high-level block diagram of components of the invention implementing the steps thereof. The steps of FIG. 2 (and all the other Figures employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 2 (and the other swim lane Figures) may also be implemented by the embodiment of FIG. 1.

Referring to FIG. 2, four swim lanes are shown including a lane for a PCMS 100, a user device 202, a first party 204 and a second party 206. At step 210, a second party may apply for an information vault account in the PCMS 100. At step 215, a first party may apply for an information vault account. At step 220, the PCMS 100 via information vault service creates one or more user accounts by processing and authenticating the applicant(s). An example of this may be found in co-pending U.S. patent application Ser. No. 10/964,876.

At step 225, the PCMS 100 may dialogue with each of the user(s) to set up their contact information in the vault. The contact information may include personal names, addresses, email addresses, phone numbers, paging numbers, IM identifiers, user identifiers, or other similar contact information. This dialog is typically performed for every owner and user independently, with each user and owner separately supplying their own contact information.

At step 230, the first party owner specifies their contact information. Likewise, at step 235, the second party user specifies their contact information. At step 240, the PCMS stores each user's contact information in their vault account, typically encrypted. A fee may also be charged for the transaction. At step 245, an account for each user may be stored in an appropriate database (e.g., database 246) typically served and managed by a server with adequate security controls and backup. At step 250, the first party may logoff.

At step 255, the second party may logoff. The accounts are created and the contact information is stored in the information vault 105.

Figure 3A:
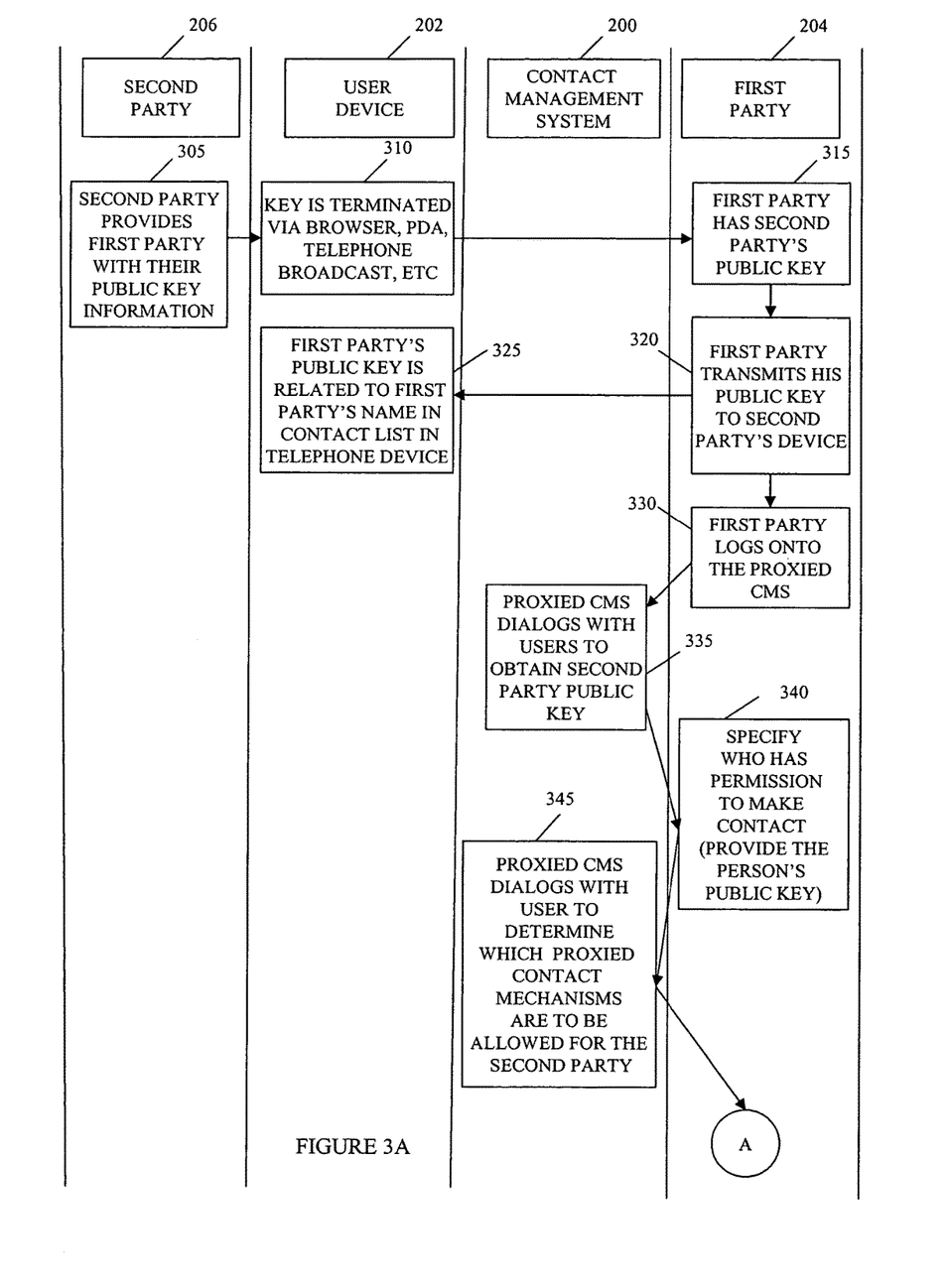
FIGS. 3A and 3B are swim lane diagrams showing steps of an embodiment of changing information in the PCMS, according to the invention.
Figure 3B:
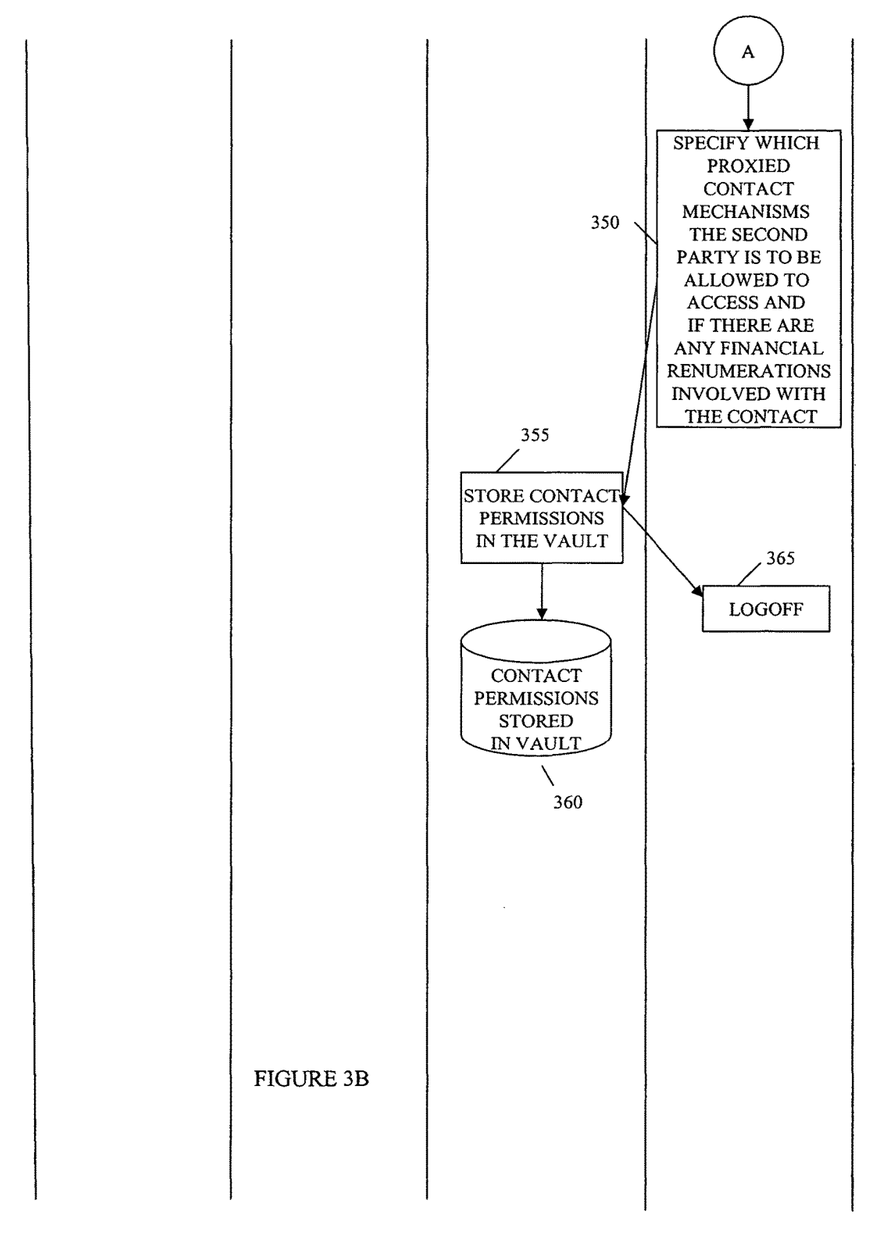

FIGS. 3A and 3B are swim lane diagrams showing steps of an embodiment of changing information in the PCMS. At step 305, a second party provides a first party with the second party's public key information. At step 310, upon second party action, the public key of the second party may be transmitted via a browser, PDA, telephone broadcast, or other transmission for the device in use to a first party. This may also include an authentication step by the device to authenticate the second party. At step 315, a first party receives the second party's public key for future use in communicating with the second party. At step 320, the first party may choose to reciprocate by transmitting the first party's public key to the second party's device. At step 325, the first party's public key may be related to the first party's name in a contact list in the user device.

At step 330, the first party logs into the PCMS. At step 335, the PCMS may dialog with the first party in order to obtain the second party's public key. At step 340, the first party specifies who has permission to make contact with the first party by providing the public key(s) of any party (e.g., second party) that may contact the first party. At step 345, the PCMS dialogs with the first party to determine which proxied contact modes and mechanisms are permitted for each permitted party (e.g., the second party).

At step 350, the first party may specify which proxied mechanisms or modes the permitted party or parties (e.g., second party) may be allowed to use in contacting the first party and whether there are to be any fees involved the contact. Different fees may be applied depending on the mode of contact. At step 355, the contact permission(s) may be stored in a contact permissions database (e.g., database 360). In embodiments, a batch file input may also be supported. This may be useful to supply certain financial transaction oriented contact permissions where an external "match up" process may input data via batch mode. At step, 365, the first party may log off the PCMS.

Figure 4:
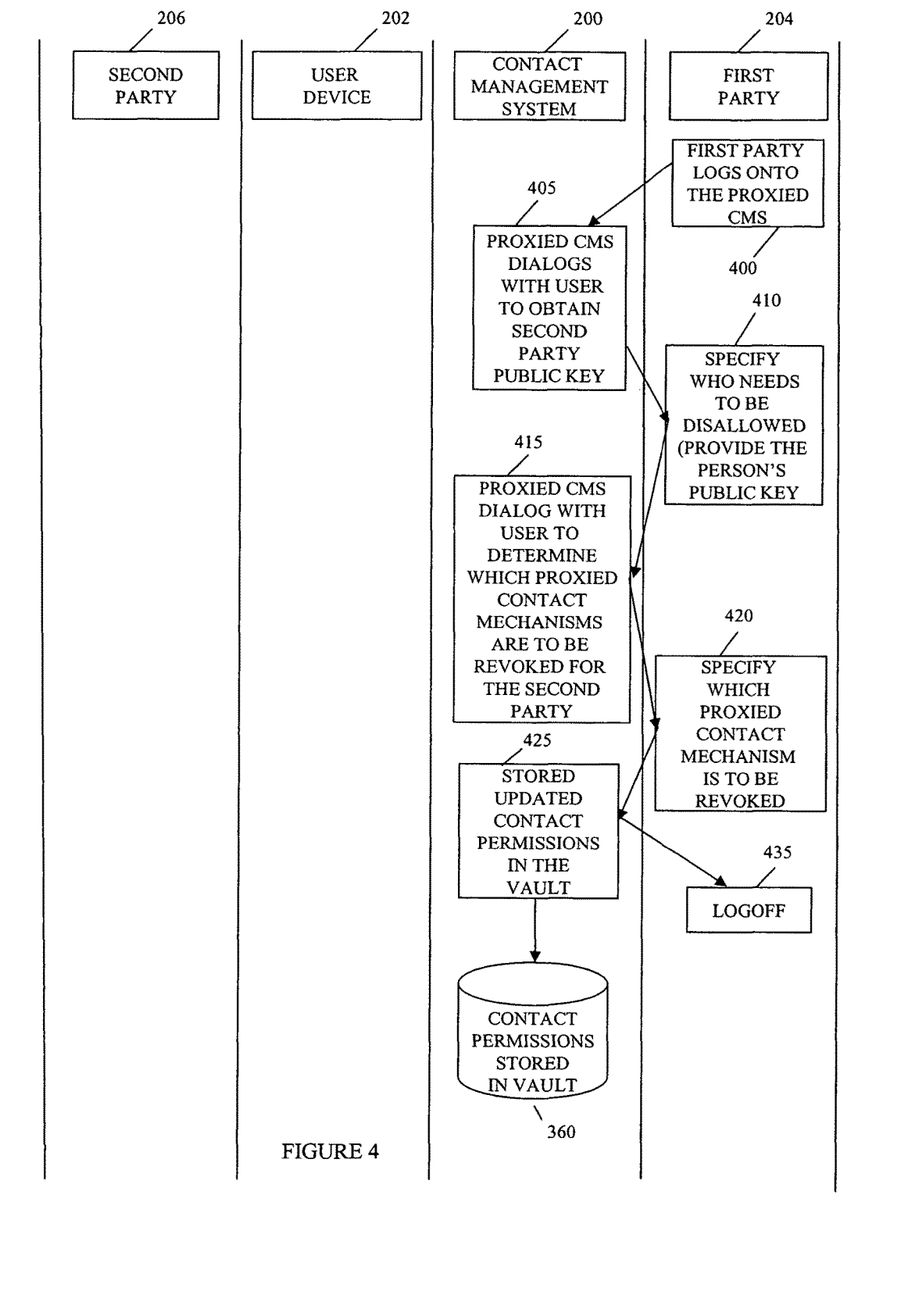
FIG. 4 is a swim lane diagram of an embodiment showing steps of an owner revoking contact permission, according to the invention.

FIG. 4 is a swim lane diagram of an embodiment showing steps of an owner revoking contact permission. At step 400, a first party user logs into the PCMS. At step 405, the PCMS dialogs with the user to obtain a second party public key for use in identification of an entity for which one or more rights are to be revoked. At step 410, the first party specifies the entity for revoking one or more rights by supplying a public key identifier of the entity. At step 415, the PCMS dialogs with the first party to determine which proxied contact mechanisms are to be revoked for the entity (e.g., a second party). At step 420, the first party specifies which proxied contact mechanism or mode is to be revoked (or alternatively, altered to a new mode and/or new restriction applied). At step 425, the updated contact permissions may be stored in a contact permissions database (e.g., database 360) associated with the vault of the PCMS. At step 435, the first party may log off. A fee may be charged for the revocation or update transaction.

Figure 5:
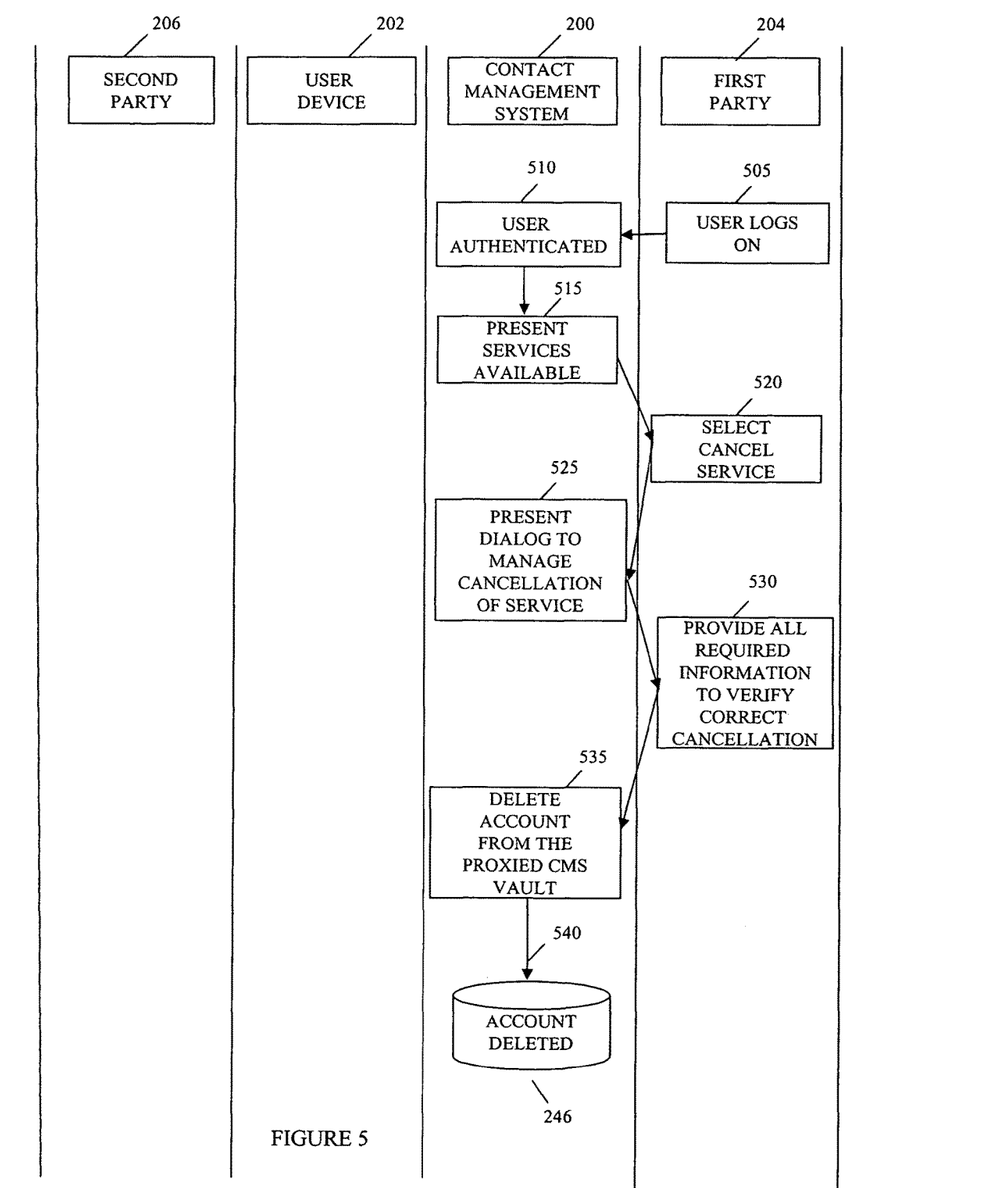
FIG. 5 is a swim lane diagram of an embodiment showing steps of terminating service of the PCMS for a user, according to the invention.

FIG. 5 is a swim lane diagram of an embodiment showing steps of terminating service of the PCMS for a user. At step 505, a first party may log into the PCMS. At step 510, the first party may be authenticated by the PCMS. At step 515, the PCMS presents services that are available to the first party, perhaps by a graphical user interface (GUI). At step 520, the first party may select an option to cancel PCMS service. At step 525, the PCMS provides a dialog to manage the cancellation of service for the first party.

At step 530, the first party provides requested information to cancel the service which may include identification, account numbers or payment of fees. At step 535, the account associated with the first party may be deleted from the PCMS, or alternatively marked as suspended. At step 540, the deletion (or suspension) is applied to the PCMS account database. A fee may also be charged for the transaction.

Figure 6A:
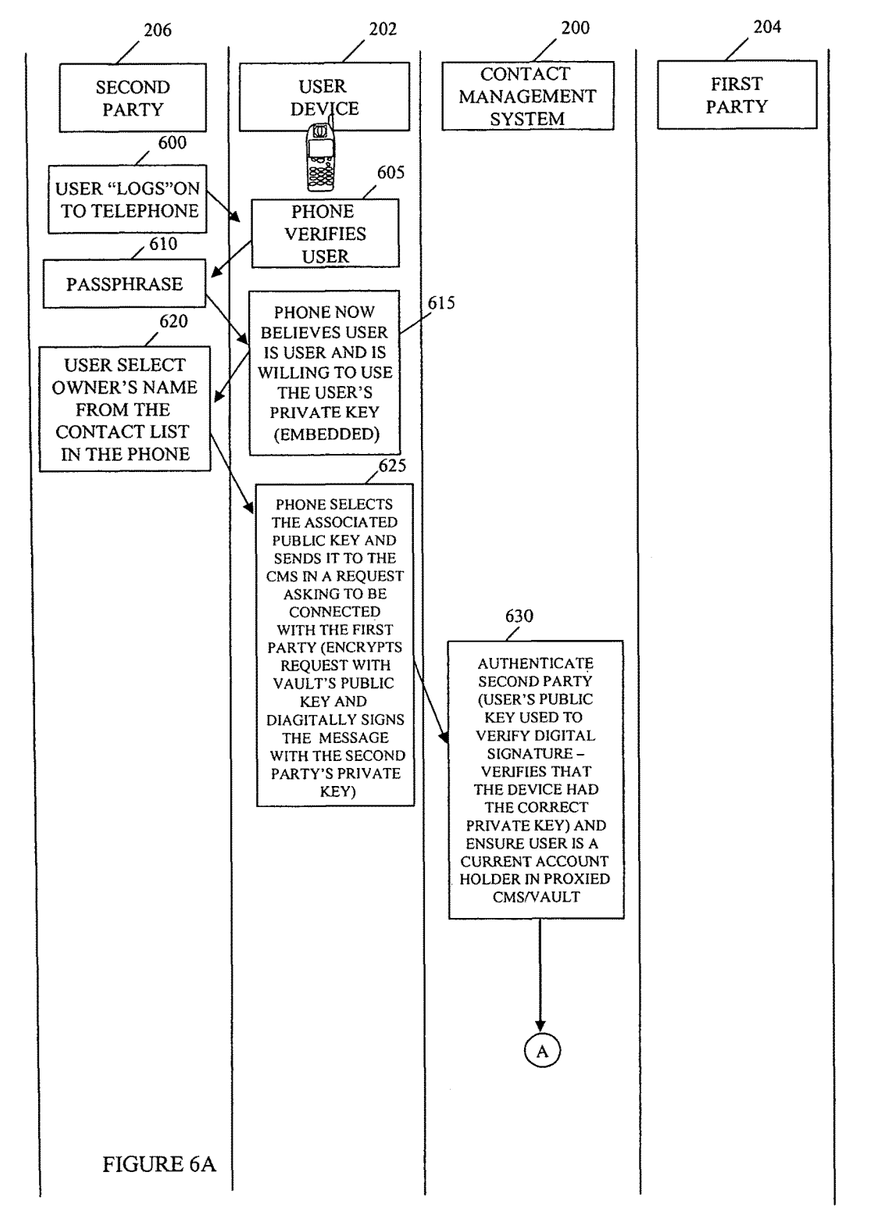
FIGS. 6A and 6B are swim lane diagrams of an embodiment showing steps of establishing PCMS connections, according to the invention.
Figure 6B:
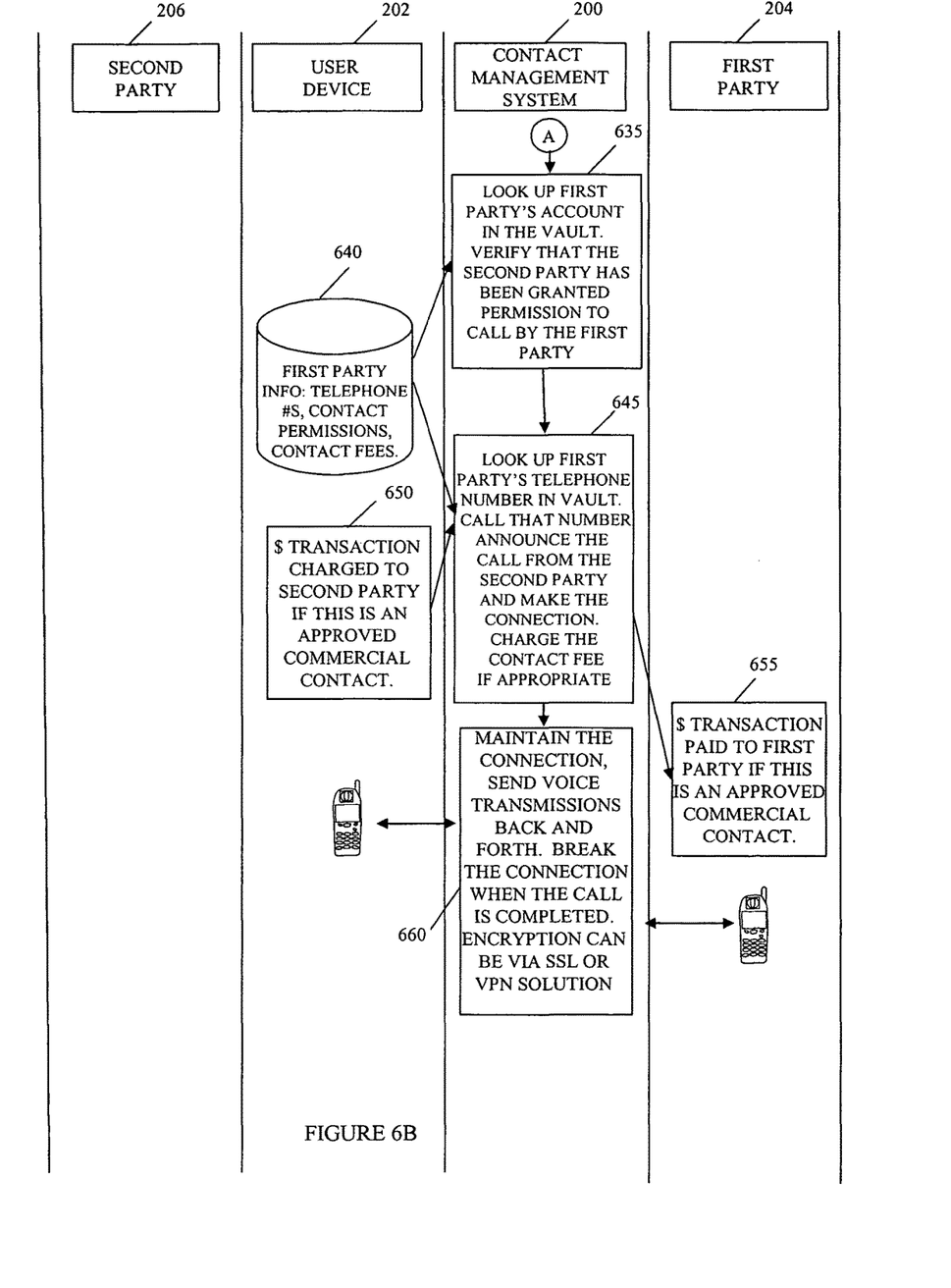

FIGS. 6A and 6B is a swim lane diagram of embodiment showing steps of establishing PCMS connections. At step 600, a second party logs into their user device such as a telephone, PDA, or the like. At step 605, the user device may identify (i.e., verify) the first party by password, pass-phrase, PIN, or a biometric entry, for example. At step 610, a pass-phrase, or other identification, may be input by the second party to the user device. At step 615, the user device verifies the identification provided by the second party. The process continues based on the belief that the second party is an appropriate user. The process uses the second party's private key, which is typically embedded in the user device, for future encryption in communications with the PCMS. This device may include technologies such as PKI certificates that process pass-phrase challenges or biometrics. The user device may also store names and public key associations and/or digital signatures. The user device may also be technologically capable of communicating over wired or wireless IP networks to request service from the PCMS network site which may include VoIP protocols.

At step 620, the second party may select a first party's name or other identifier from the contact list in the user device. At step 625, the telephone may select the public key associated with the identified first party and send it to the PCMS in a request, asking to be connected to the first party. The request may be digitally signed by the second party's private key, and may be typically encrypted with the vault's public key. At step 630, the PCMS authenticates the second party using the second party's public key to verify that the digital signature is the correct signature as encrypted by the second party's private key.

At step 635, the PCMS may initiate a check to verify that the second party has access permission to the first party per the mode of communications requested. At step 640, the permissions may be retrieved from the vault and verified. At step 645, the PCMS may identify the first party's telephone number (or other address, as appropriate) and announce the call to the first party (e.g., ring the first party) and establish the connection according to appropriate device and technology of the select mode of communications. At step 650, optionally, a fee may be charged for this connection to one or both parties. (Commercial contacts may be charged different fees from non-commercial connections) At step 655, the fee may be credited to the first party's account, as appropriate. Additionally, a portion of the fee, or an additional fee, may be paid to the PCMS proprietor for services rendered.

At step 660, the PCMS establishes a connection appropriate to the mode, e.g., a telephone call, between the first party and the second party. In this embodiment, the PCMS may enable the communications according to the type of communications being requested. Additionally, the PCMS may interact with agents or equipment necessary to effect the communications involved (such as VIOP enabled switches, routers or cell phone equipment, just to name a few possibilities) via signaling arrangements to set-up, establish, control and/or release a proxied connection or message. In this manner, controlled access between individuals or entities may be accomplished in a secured mode without compromise of confidential personal information.

Another Example of Use

By way of an illustrative example, the invention may establish communication between one or more entities in real-time. This type of communication may protect a user's personal contact information by using vault's PKI based security mechanisms which may require devices like phones, computers, or PDAs to contain embedded PKI digital certificates.

The phone (or other similar device) may authenticate the contact information user via a pass-phrase, personal identification number (PIN) or biometric, thus enabling the phone to securely communicate with the PCMS vault. The vault's public key may be used to encrypt communication to the PCMS. Thus, the PCMS trusts that the correct contact information user is at the other end of the communication link and that the message has not been compromised in transit.

Once the contact user has logged on to the phone and selected the name of the person to be called, the phone connects to the PCMS. This connection is secured and the phone may then ask for a connection to another user. At which time, the PCMS may establish the connection based on criteria established by the owner of the contact information associated with the another user. The telephone may then automatically place a call and establish a connection to both parties, avoiding storing the telephone number or any returned data in persistent telephone memory such as disk, CD-ROM, or long term memory (e.g., EEPROM, FLASH, or the like). This telephone call is illustrative and may include traditional telephone calls, wireless calls, Internet calls, voice-over-internet protocol (VoIP) calls, Fax calls, IM calls, paging, or the like. The telephone address may include any number of addressing schemes including traditional telephone numbers or other network addresses such as Internet addresses or user IDs.

While the invention has been described in terms of embodiments, those skilled in the art will recognize that the invention can be practiced with modifications and in the spirit and scope of the appended claims.

What is claimed is:

1. A method of providing proxied communications using a proxied contact management system (PCMS), comprising:
   requesting a connection to a communication device of a first party by a communication device of a second party at the PCMS by submitting a public key of the first party from the communication device of the second party to the PCMS;
   retrieving, by the PCMS using the public key of the first party, stored information associated with the first party, the stored information including at least one party permitted to contact the first party and, for each of the at least one party permitted to contact the first party, a permitted mode of communication and a time period during which the contact may occur;
   verifying that the second party has permission to contact the first party based on the retrieved stored information;
   denying the proxied communications when the retrieved stored information indicates that the second party is ineligible to contact the first party; and
   if permitted, establishing the proxied communications via the PCMS between the communication device of the first party and the communication device of the second party while preventing the communication device of the second party from receiving any information regarding contact information including at least one of a telephone number and an email address of the first party, other than the public key, wherein the proxied communications comprise the PCMS contacting the communication device of the first party via a same communication mechanism used by the communication device of the second party to contact the PCMS in order to request the connection to the communication device of the first party, wherein, during the establishing, the connection between the communication device of the second party and the communication device of the first party is enabled and sustained via the PCMS, and wherein the PCMS utilizes a vault services system that allows users to create accounts, deposit contact information, and read, update or remove information.

2. The method of claim 1, wherein the requesting a connection step includes encrypting a message using a public key of the PCMS and the message is digitally signed by the second party.

3. The method of claim 1, further comprising verifying the second party using at least any one of a password, a biometric and a pass-phrase.

4. The method of claim 1, wherein the stored information defines an entity that is permitted to make a contact with the first party.

5. The method of claim 1, further comprising revoking a right of the second party to make a contact with the first party.

6. The method of claim 1, further comprising charging a fee for establishing the proxied communications.

7. The method of claim 6, wherein the contact information of the first party is encrypted and associated with the public key of the first party.

8. The method of claim 7, further comprising authenticating the first party and the second party.

9. The method of claim 8, wherein the stored information includes defining which modes of communications are assessable by the second party.

10. The method of claim 9, wherein the communication devices of the first party and the second party are at least any one of a telephone device, a personal digital assistant device (PDA) and a computer.

11. The method of claim 10, wherein the communication device of the first party is configured to avoid storing the contact information of the first party in persistent memory.

12. The method of claim 11, wherein the fee charged for establishing the proxied communications is different depending upon the mode of contact.

13. The method of claim 1, wherein the contact information includes both the telephone number and the email address of the first party.

14. The method of claim 13, wherein the communication devices of the first party and the second party are at least any one of a telephone device, a personal digital assistant device (PDA) and a computer.

15. The method of claim 1, wherein the stored information further includes a public key of each of the at least one party permitted to contact the first party.

16. The method of claim 15, wherein the verifying that the second party has permission to contact the first party based on the retrieved stored information comprises determining that a public key of the second party is included in the retrieved stored information.

* * * * *